United States Patent
Cormier et al.

(10) Patent No.: US 10,250,006 B2
(45) Date of Patent: Apr. 2, 2019

(54) SYSTEM AND METHOD FOR GENERATING WAVELENGTH-TUNABLE, ULTRA-SHORT LIGHT PULSES HAVING HIGH POWER SPECTRAL DENSITY

(71) Applicants: UNIVERSITE DE BORDEAUX, Bordeaux (FR); CENTRE NATIONAL DE LA RECHERCHE SCIENTIFIQUE, Paris (FR)

(72) Inventors: Eric Cormier, Cestas (FR); Jérome Lhermite, Anglet (FR); Romain Royon, Dax (FR); Laurent Sarger, Talence (FR)

(73) Assignees: UNIVERSITE DE BORDEAUX, Bordeaux (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/540,734

(22) PCT Filed: Dec. 24, 2015

(86) PCT No.: PCT/FR2015/053751
§ 371 (c)(1),
(2) Date: Jun. 29, 2017

(87) PCT Pub. No.: WO2016/108020
PCT Pub. Date: Jul. 7, 2016

(65) Prior Publication Data
US 2017/0352999 A1 Dec. 7, 2017

(30) Foreign Application Priority Data
Dec. 29, 2014 (FR) .................................. 14 63399

(51) Int. Cl.
*G02F 1/11* (2006.01)
*H01S 3/00* (2006.01)
(Continued)

(52) U.S. Cl.
CPC .......... *H01S 3/0078* (2013.01); *G02B 26/001* (2013.01); *G02F 1/11* (2013.01);
(Continued)

(58) Field of Classification Search
CPC ...... G02F 1/39; G02F 2201/34; H01S 3/0078; H01S 3/06754
(Continued)

(56) References Cited

U.S. PATENT DOCUMENTS

| 5,812,567 A | 9/1998 | Jeon et al. |
| 2005/0226278 A1 | 10/2005 | Gu et al. |
| 2015/0131143 A1* | 5/2015 | Hodgson ............... H01S 3/0092 359/326 |

OTHER PUBLICATIONS

International Search Report PCT/FR2015/053751 dated Mar. 11, 2016.
(Continued)

*Primary Examiner* — Mahidere S Sahle
(74) *Attorney, Agent, or Firm* — Young & Thompson

(57) ABSTRACT

Disclosed is a system for generating wavelength-tunable, ultra-short light pulses within the visible or infrared light spectrum. The system includes an injection module including a light source and a wavelength-tunable spectral filter. The light source is suitable for generating short light pulses, having a duration measured in nanoseconds, within an emission spectrum having a spectral width of several tens of nanometers to several hundred nanometers. The spectral filter has a spectral width between 250 pm and 3 nm and is suitable for spectrally and temporally filtering the short light pulses such that the injection module generates wavelength-tunable, spectrally filtered, ultra-short light pulses. The
(Continued)

Figure 1:
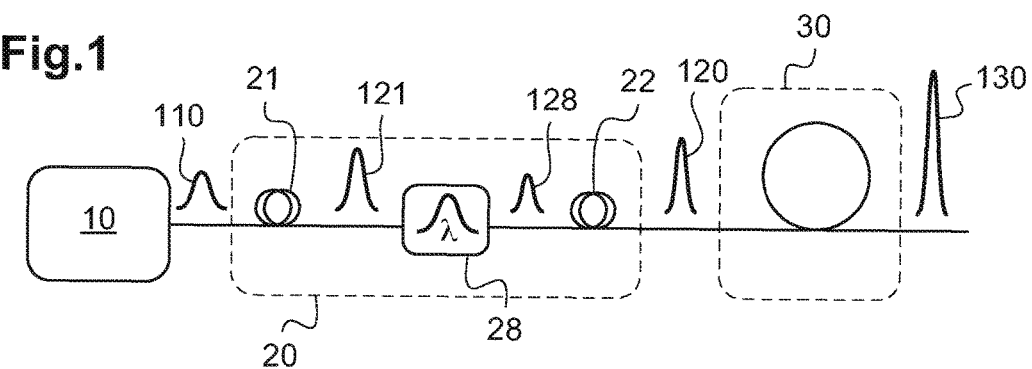

system also includes at least one optical amplifier suitable for generating wavelength-tunable, ultra-short, amplified pulses based on the wavelength of the spectral filter.

18 Claims, 4 Drawing Sheets

(51) Int. Cl.
    *G02B 26/00*     (2006.01)
    *G02F 1/39*     (2006.01)
    H01S 3/067     (2006.01)
    *H01S 3/08*     (2006.01)
    *H01S 3/11*     (2006.01)
    *H01S 3/16*     (2006.01)
    *G02F 1/35*     (2006.01)

(52) U.S. Cl.
    CPC .............. *G02F 1/39* (2013.01); *H01S 3/0057* (2013.01); *H01S 3/0092* (2013.01); *H01S 3/06754* (2013.01); *G02F 2001/3528* (2013.01); *G02F 2201/34* (2013.01); *H01S 3/06725* (2013.01); *H01S 3/06758* (2013.01); *H01S 3/06791* (2013.01); *H01S 3/08027* (2013.01); *H01S 3/1112* (2013.01); *H01S 3/1618* (2013.01); *H01S 2301/08* (2013.01)

(58) Field of Classification Search
    USPC .................................................. 359/238–289
    See application file for complete search history.

(56) References Cited

OTHER PUBLICATIONS

Romain Royon et al., "MW peak power infrared source for tunable visible light generation by Four-Wave Mixing", 2014 Conference on Lasers and Electro-Optics (CLEO)—Laser Science to Photonic Applications, The Optical Society, Jun. 8, 2014, pp. 1-2, XP032707083.
Romain Royon et al., "fs mode-locked fiber laser continuously tunable from 976 nm to 1070 nm", 2013 Conference on Lasers & Electro-Optics Europe & International Quantum Electronics Conference CLEO Europe/IQEC, IEEE, May 12, 2013, p. 1, XP032588916.
Guy et al., "A Duration-Tunable, Multiwavelength Pulse Source for OTDM and WDM Communications Systems", IEEE Photonics Technology Letters, IEEE Service Center, Piscataway, NJ, US, vol. 9, No. 7, Jul. 1997, pp. 1017-1019, XP011425383.

\* cited by examiner

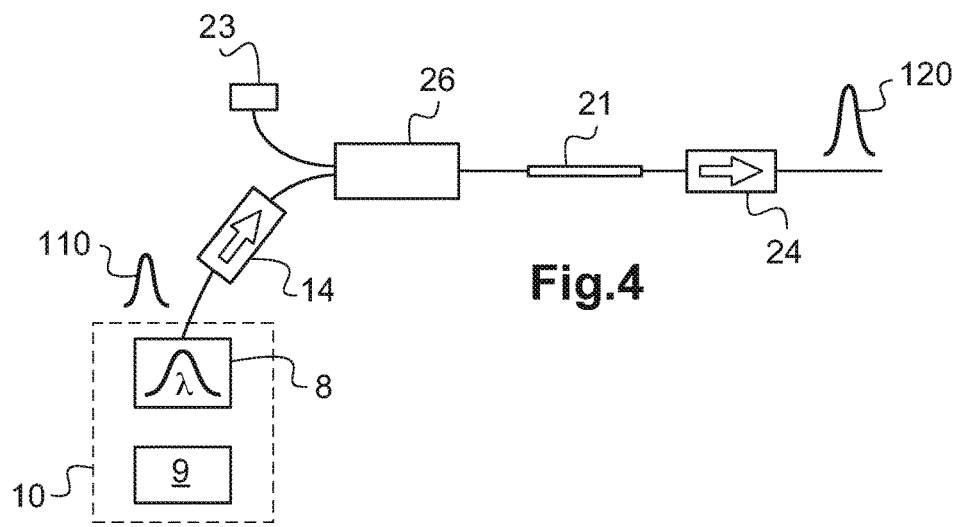
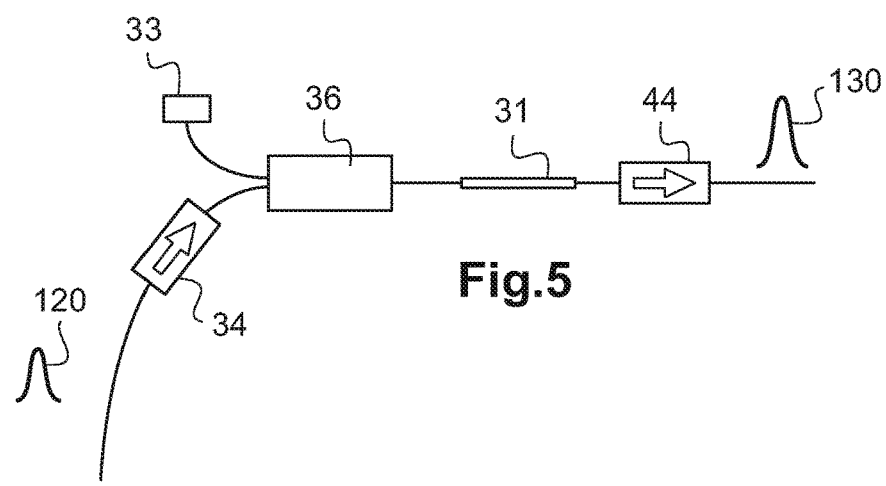
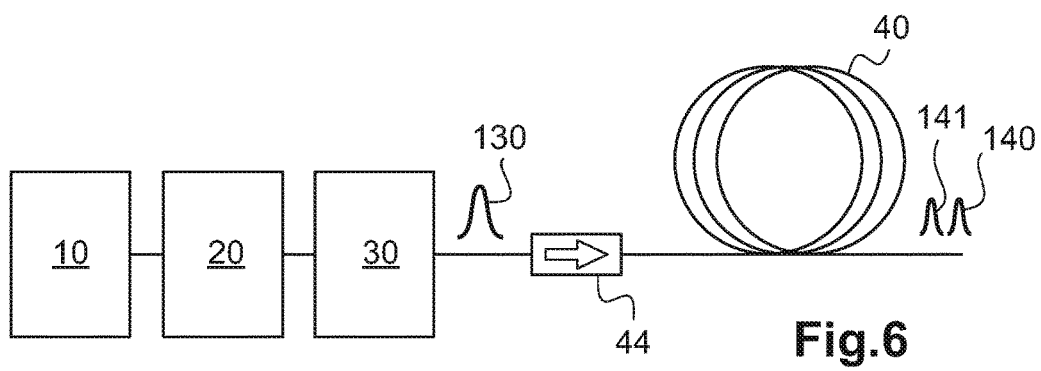

SYSTEM AND METHOD FOR GENERATING WAVELENGTH-TUNABLE, ULTRA-SHORT LIGHT PULSES HAVING HIGH POWER SPECTRAL DENSITY

TECHNICAL FIELD TO WHICH THE INVENTION RELATES

The present invention generally relates to lasers. More precisely, the invention relates to a system and a method for generating wavelength-tunable light pulses of picosecond (ps) or sub-picosecond (sub-ps) duration.

In particular, the invention relates to a system and a method for generating ps or sub-ps pulses that are continuously tunable in the visible, near-infrared and/or mid-infrared wavelength domain.

In the present document, it is understood by ultra-short pulse a pulse with a duration of the order of a picosecond, comprised between 0.1 ps and about 200 ps. It is understood by short pulse a pulse with a duration of the order of a nanosecond or sub-nanosecond, comprised between about 200 ps and 100 ns.

In the present document, it is considered that the spectral domain of the electro-magnetic radiation extends in the visible from 400 to 800 nm, the ultraviolet from 300 to 400 nm, the near infrared from 800 nm to 1.5 microns, the mid infrared from 1.5 to 10 microns and the far infrared from 10 to 20 microns.

TECHNOLOGICAL BACK-GROUND

The lasers find today extremely varied applications. More particularly, in bio-imagery and in medicine, it is chosen, among the available laser sources, the source that is best adapted as a function of the particular needs of a precise application. The domain of operation of a laser source is defined by a set of specific parameters comprising in particular the accessible wavelength range, the time regime and the level of energy and/or of power delivered.

According to the type of laser used, the wavelength range of a laser may be located in the ultraviolet, the visible or the infrared. The time regime of a laser may be continuous or pulsed, wherein the pulses may be of nanosecond, picosecond or femtosecond duration. The energy and the power delivered by a laser may also vary by several orders of magnitude according to the type of laser.

In a platform of imagery or a medical centre, to implement different applications, it is today necessary to have several laser sources each having a proper domain of operation, each laser source being dedicated to a specific application.

For example, a dye laser emitting at a wavelength in the red (about 800 nm) is used in continuous mode. A neodymium-YAG (Nd-Yag) laser operates in pulsed or continuous mode in the near infrared (~1 μm). A Nd-YAG laser, doubled in frequency, in a KTP crystal, operates in pulsed or continuous mode for an emission at a wavelength in the green (0.5 μm) and an erbium-YAG (Er-YAG) laser for an emission in the infrared at 3 μm.

However, the increase of the number of laser sources results in an increase of the cost of investment and of operation, as well as the complexity of implementation and maintenance. The multiplicity and diversity of specific laser sources constitutes a major brake to their wider diffusion.

Moreover, even in a well-equipped medical or imagery centre, the range of treatments remain generally limited, in particular by the reduced choice in the accessible wavelengths. Hence, in dermatology, according to the skin tone of the patient, it must be possible to use a well-defined wavelength. It is hence particularly desirable to develop a single laser source able to generate a laser radiation having a domain of operation, and in particular a wavelength, that is adjustable in order to be the most efficient possible relative to a particular pathology.

On the other hand, in order to increase the power of the pulses without increasing the deposition of heat, it is desirable to user pulses of shorter and shorter duration. More precisely, it is desirable to pass from the nanosecond or sub-nanosecond pulse regime, i.e. of at least several hundreds of picoseconds, to a picosecond pulse regime.

There exist wavelength-tunable dye lasers that allow generating a laser beam of 1 mW to 10 W power. However, the wavelength tunability of a dye laser lies on the use of different dyes in liquid phase. A drawback is that each dye has a limited lifetime. Moreover, the dye lasers impose severe maintenance constraints. This way has been abandoned for long and the only dye lasers still on the market have a very reduced wavelength range, most of the time mono-colour.

Laser systems are also known, which are based on the combination of a near-infrared laser source and a non-linear optical crystal to produce, by second harmonic generation, a visible radiation tunable over a range of 40 nm in the blue (between 450 and 490 nm) and over a range of 60 nm in the green (between 500 and 560 nm), with pulse durations of 0.1 ps to 100 ns.

Other light sources, of the optical parametric oscillator or OPO type, are based on a solid non-linear optical component placed in an optical cavity. In particular conditions of phase matching, from a pump wave, an OPO generates a signal wave and a complementary wave (idler), the sum of the optical frequencies of the signal wave and of the complementary wave being equal to the optical frequency of the pump wave. The wavelength tunability of an OPO is obtained by modifying the orientation and/or the temperature of the non-linear optical component. Nevertheless, the OPO sources have not given rise to an industrial development.

OBJECT OF THE INVENTION

There thus exists a need for a system and a method allowing the making of a system for generating high-power and/or high-energy light pulses, which are wavelength-tunable over a wide spectral domain in the domain of the visible to the mid infrared.

Preferably, it is desirable that the light pulse generating system is fibred at the exit.

One of the objects of the invention is to propose a system for generating ultra-short light pulses, continuously wavelength-tunable over a wide spectral domain.

The present invention has for object to remedy the drawbacks of the prior systems and more particularly relates to a system for generating ultra-short light pulses, which are wavelength-tunable over a spectral domain comprised between the ultraviolet and the infrared.

According to the invention, the system comprises an injection module comprising a light source and a wavelength-tunable spectral filter, the light source being adapted to generate short light pulses, of a duration comprised between several hundreds of picoseconds and a hundred of nanoseconds, said short light pulses extending over a spectral band of emission in the near-infrared domain, the spectral band of emission having a spectral width of several tens of nanoliters to several hundreds of nanoliters, the spectral filter having at least a spectral bandwidth defined by a spectral width comprised between 10 pm and 10 nm, preferably from 250 nm to 1 nm, and a central wavelength, said spectral bandwidth being tunable in a spectral range [Lambda1; Lambda2] comprised in the spectral band of emission of the source, the spectral filter being adapted to spectrally filter and to temporally shape said short light pulses, so that the injection module generates ultra-short light pulses, of a duration of the order of a nanosecond, a femtosecond or a picosecond, and preferably of the order of a picosecond, spectrally filtered and wavelength-tunable as a function of the central wavelength of said spectral bandwidth; and at least one optical amplifier arranged at the exit of the injection module, said at least one optical amplifier being adapted to receive said spectrally filtered and wavelength-tunable ultra-short light pulses and to generate by optical amplification ultra-short amplified pulses, spectrally filtered and wavelength-tunable as a function of the central wavelength of said spectral bandwidth of the spectral filter.

The invention allows generating pulses that are both ultra-short (from 1 ps to about 20 ps), spectrally filtered with a spectral width comprised between a few hundreds of pm and a few nm, and wavelength-tunable over a wide spectral range, for example over a spectral range of at least 50 nm to 300 nm wide, for example in the near-infrared domain, the central wavelength being of about 1 micron. Hence, the injection module is wavelength-tunable over the spectral range [Lambda1; Lambda2] of the filter, while generating ultra-short pulses of low spectral width.

This injection module allows injecting pulses in different optical amplifiers, and hence obtaining ultra-short amplified pulses that are wavelength-tunable over a wide spectral range, each pulse having a low spectral width (of the order of a nanoliter). These amplified pulses have hence a high power spectral density.

The power spectral density is herein defined as the ratio between the power of a pulse and the spectral width of this pulse.

The pulse generating system does not use a pulse compressor, but simply a wide spectral band source combined with a filter having a wavelength-tunable bandwidth and an optical amplifier.

The wavelength matching of the amplified pulses is very easy to control by the wavelength matching of the filter.

In a first embodiment, the light source comprises a supercontinuum source and the spectral filter is arranged on the optical path downstream from the supercontinuum source.

In a second embodiment, the light source comprises a non-linear amplifying loop mirror, the non-linear amplifying loop mirror comprising another optical amplifier arranged on the optical path of the non-linear loop mirror and the spectral filter being arranged on the optical path of the non-linear loop mirror.

In a variant of this second example, the non-linear amplifier mirror is 8-shaped and comprises a first, bidirectional non-linear amplifying loop and a second, unidirectional non-linear loop, the spectral filter being arranged in the first non-linear loop.

Advantageously, the spectral filter comprises a prism-based filter, a diffraction grating-based filter, an interferential filter, a birefringent filter, un Bragg mirror diffractive filter, a resonating mirror diffractive filter, an acousto-optic filter or a thin-layer acousto-optic filter.

According to a particular aspect, the spectral filter is an interferential filter or an acousto-optic filter configured to filter simultaneously a plurality of spectral bandwidths spectrally spaced apart from each other, each spectral bandwidth being defined by a central wavelength and a spectral width comprised between 10 pm and 10 nm, and each central wavelength of the spectral filter being tunable in a spectral range comprised in the spectral band of emission of the light source.

Preferably, the spectral filter has a spectral width lower than 1 nm.

According to a particular and advantageous aspect of the invention, said at least one optical amplifier comprises a plurality of optical amplifiers arranged as a star around the injection module.

According to a particular and advantageous aspect of the invention, said at least one optical amplifier comprises an optical fibre pre-amplifier and a power optical fibre amplifier arranged in series.

According to a particular and advantageous embodiment, the light source, the spectral filter and/or the at least one optical amplifier comprise optical fibre components.

According to a particular and advantageous embodiment, said at least one optical amplifier comprises a rare earth-doped optical fibre.

In an embodiment of the invention, the system for generating ultra-short light pulses further comprises a dispersive optical component of negative dispersion arranged at the exit of the at least one optical amplifier, the dispersive optical component being adapted to receive simultaneously a pump pulse and an ultra-short amplified pulse and to generate, by non-linear optical effect of four-wave mixing, a first optical signal and a second optical signal, the first or the second optical signal comprising an exit light pulse of a duration of the order of a picosecond to a hundred of picoseconds and at a predetermined wavelength in the ultraviolet, visible or infrared domain, with a spectral width lower than 10 nm, the predetermined wavelength of the exit light pulse being tunable as a function of the central wavelength of the spectral filter.

According to a particular and advantageous aspect of this embodiment, the dispersive optical component comprises a section of photonic optical fibre.

The invention also relates to a method for generating wavelength-tunable, ultra-short light pulses comprising the following steps:
generating short light pulses, of low power, of a duration comprised between several hundreds of picoseconds and a hundred of nanoseconds, said short light pulses extending over a spectral band of emission having a spectral width of several tens of nanoliters to several hundreds of nanoliters, preferably said short light pulses being linearly chirped;
spectrally filtering said short pulses at a wavelength comprised in a spectral bandwidth defined by a central wavelength Lambda3 and a spectral width Δlambda3 comprised between 10 pm and 10 nm, the central wavelength (Lambda3) of said spectral bandwidth of the spectral filtering being tunable in a spectral range ([Lambda1; Lambda2]) comprised in said spectral band of emission, the spectral filtering being adapted to spectrally filter and to temporally shape said short light pulses, preferably linearly chirped, so as to generate ultra-short light pulses of a duration of the order of a picosecond, spectrally filtered and wavelength-tunable as a function the central wavelength of said spectral bandwidth, and
optically amplifying said spectrally filtered ultra-short pulses to generate ultra-short amplified pulses that are spectrally filtered and wavelength-tunable as a function of the central wavelength of the spectral bandwidth of the spectral filter.

According to a particular and advantageous aspect, the method for generating wavelength-tunable ultra-short light pulses, further comprises the following step:

generating, from a pump pulse and an ultra-short amplified pulse, by non-linear optical effect of four-wave mixing in a dispersive optical component of negative dispersion, a first optical signal and a second optical signal, the first or the second optical signal comprising an exit ultra-short light pulse, of a duration of the order of a picosecond to a hundred of picoseconds and at a predetermined wavelength in the ultraviolet, visible or infrared domain, with a spectral width lower than 10 nm, the predetermined wavelength of the exit ultra-short light pulse being tunable as a function of the central wavelength (Lambda3) of said spectral bandwidth of the spectral filter.

The invention will find a particularly advantageous application in the systems for generating light pulses for application to the bio-imagery and/or medical imaging.

The invention advantageously allows providing a system for generating ultra-short light pulses that are wavelength-tunable over a wide spectral range. In a particular embodiment, the laser system allows generating pulses of continuously tunable wavelength in the visible domain from 550 nm to 750 nm or 850 nm and/or in the infrared domain from 1.3 to 3 microns.

The present invention also relates to the characteristics that will become evident from the following description and that will have to be considered in isolation or according to any technically possible combination thereof.

Figure 2:
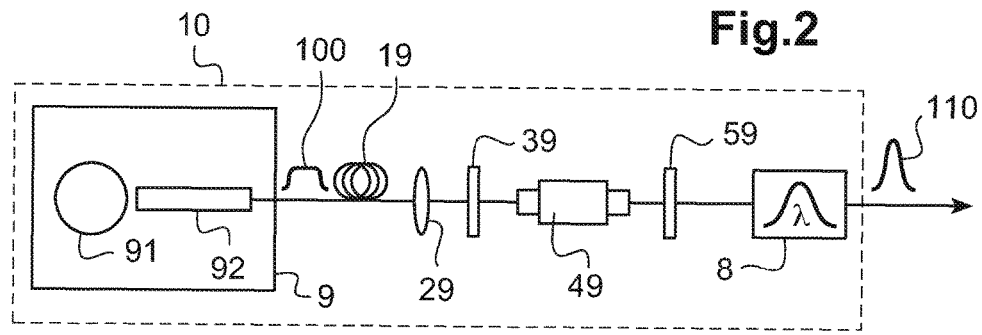
Figure 3:
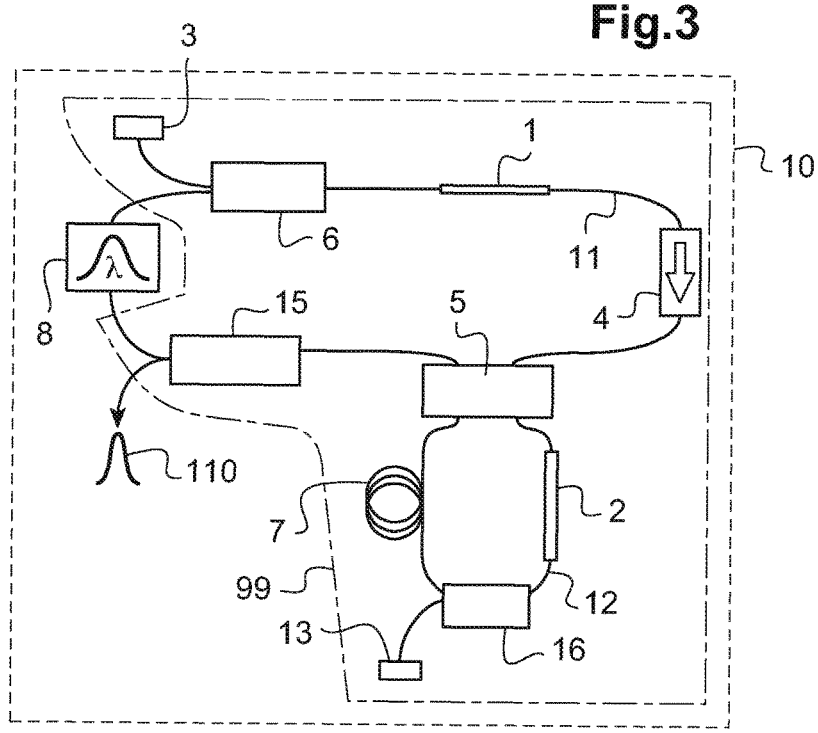
Figure 7:
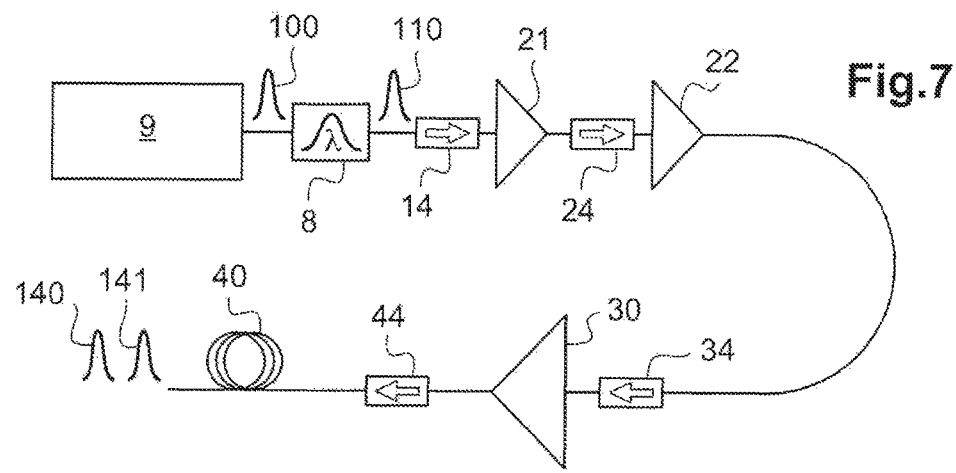
Figure 8:
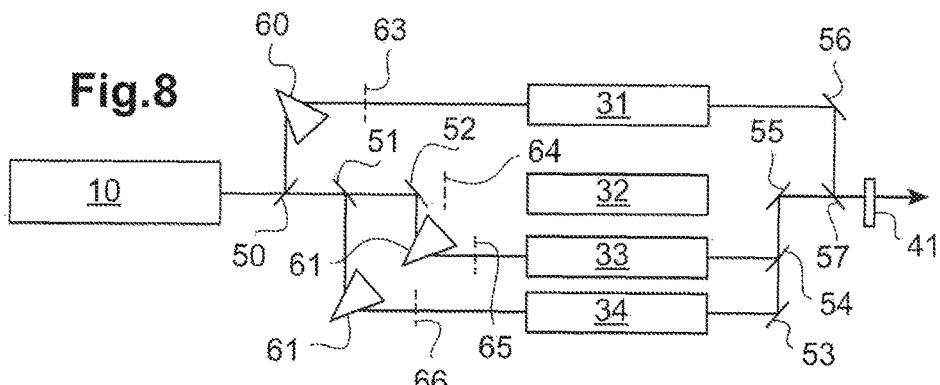
Figure 9:
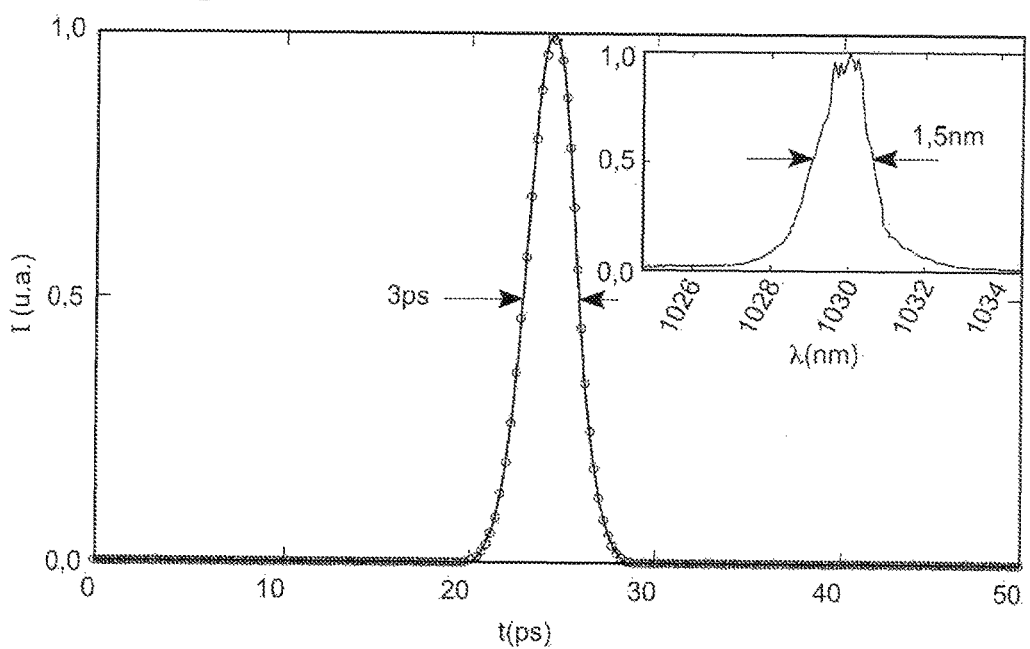
Figure 10:
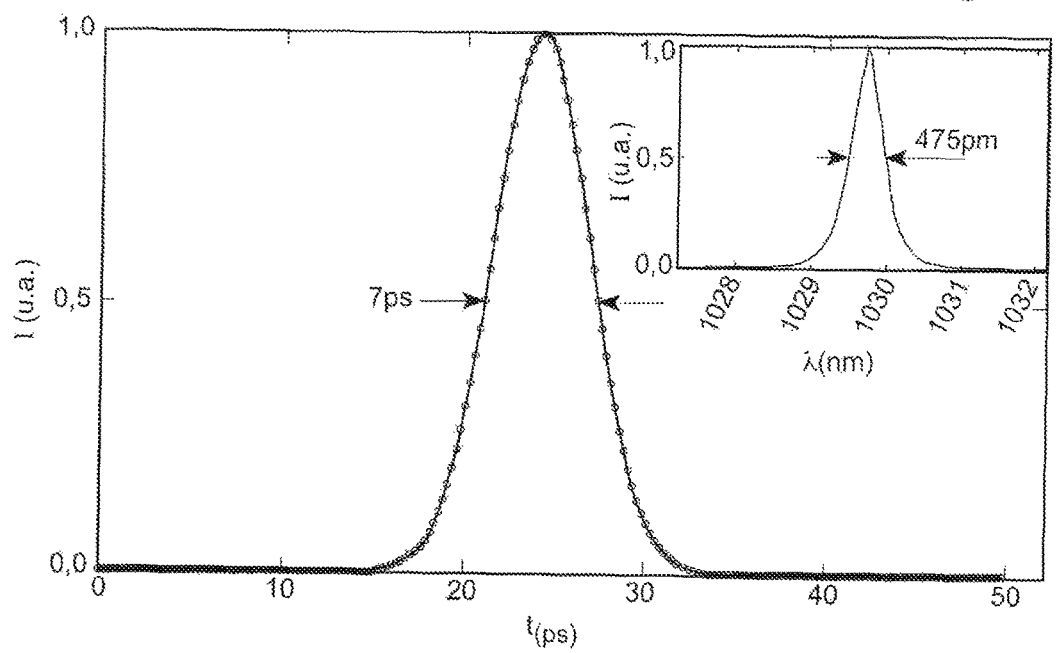
Figure 11:
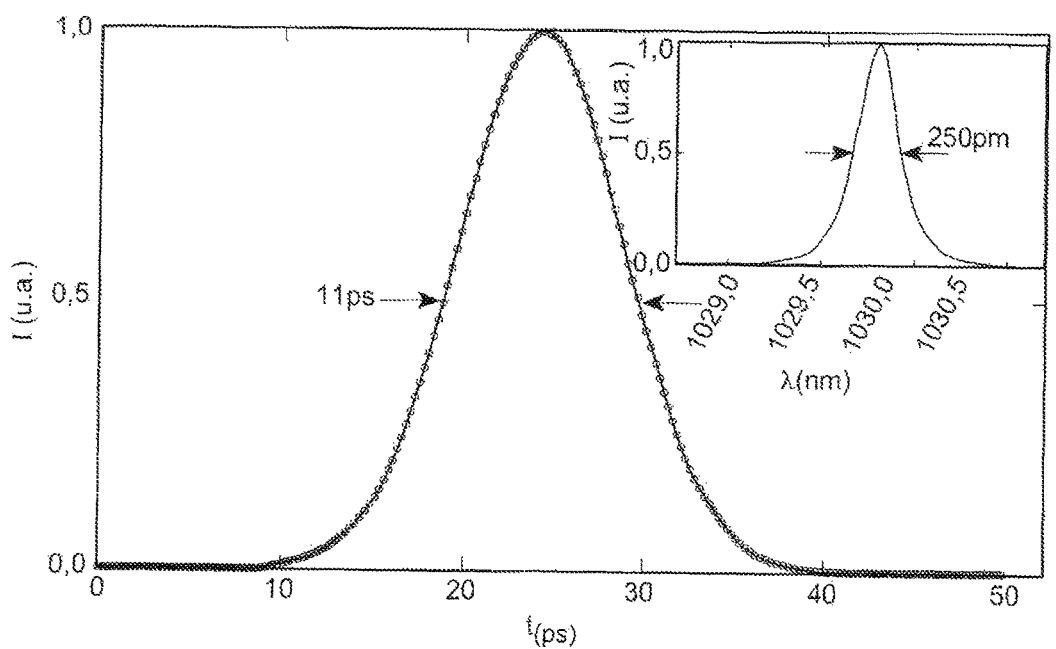

This description, which is given by way of non-limitative example, will allow a better understanding of how the invention can be implemented, with reference to the appended drawings in which:

FIG. 1 schematically shows the general architecture of a system for generating wavelength-tunable, ultra-short light pulses according to the invention;

FIG. 2 schematically shows an injection module according to a first embodiment based on a supercontinuum source;

FIG. 3 schematically shows an injection module according to another embodiment based on a non-linear loop mirror (NOLM) or non-linear amplifying loop mirror (NALM);

FIG. 4 schematically shows a pre-amplifier module;

FIG. 5 schematically shows a power amplifier module;

FIG. 6 schematically shows a system for generating wavelength-tunable ultra-short light pulse combined to a frequency converter module by four-wave mixing;

FIG. 7 illustrates an exemplary embodiment of a system for generating tunable ultra-short light pulse based on a supercontinuum-source injection module coupled to a frequency converter module by four-wave mixing, based on fibred components;

FIG. 8 schematically shows a system for generating wavelength-tunable ultra-short light pulses in which a common injection module is coupled to different optical amplifiers adapted to different wavelength ranges;

FIGS. 9 to 11 illustrate measurements of spectral and temporal profiles of wavelength-tunable ultra-short light pulses at the exit of an injection module based on a supercontinuum source, for different spectral widths of the tunable filter, respectively.

DETAILED DESCRIPTION OF AN EXEMPLARY EMBODIMENT

FIG. 1 schematically shows the general architecture of a system for generating wavelength-tunable ultra-short light pulses. This system is based on the combination of different modules.

In a simplified manner, the system for generating wavelength-tunable ultra-short light pulses includes an injection module 10, a pre-amplification module 20 and a power amplification module 30.

The injection module 10, the pre-amplification module 20 and the power amplification module 30 are arranged in series.

The pre-amplification module 20 includes for example a first optical pre-amplifier 21 arranged in series with a second optical pre-amplifier 22, and separated by a spectral filter 28, preferably of the band-pass type.

As detailed hereinafter in connection with FIGS. 2 and 3, the injection module 10 generates ultra-short light pulses 110 of a duration of the order of a picosecond, that are spectrally filtered over a narrow bandwidth comprised between a few hundreds of picoliters and a few nanoliters and wavelength-tunable.

These ultra-short light pulses 110 may then be amplified, to form amplified light pulses 120, 130 that are wavelength-tunable and of high power spectral density.

By way of illustrative example, the pre-amplification module 20 receives the ultra-short light pulses 110. The first optical pre-amplifier 21 generates pre-amplified light pulses 121. The optical component 28 receives the pre-amplified light pulses 121 and generates filtered light pulses 128. The second optical pre-amplifier 22 receives the light pulses 128 and generates pre-amplified light pulses 120.

The optical power amplifier 30 receives the pre-amplified light pulses 120 and generates amplified light pulses 130. These amplified light pulses 130 are ultra-short, of a duration comprised between 0.1 and 30 picoseconds, spectrally filtered over a narrow band-width (between 250 pm and 1.5 nm) and wavelength-tunable as a function of the wavelength of the injection module 10.

The amplified light pulses 120, 130 may also be converted in frequency so as to generate light pulses 140, 141 that are wavelength-tunable in other wavelength domains than the spectral domain of the injection module.

It is hence obtained a system for generating ultra-short light pulses that are wavelength-tunable over a very wide wavelength domain and of high power spectral density.

We will now describe in a more detailed manner the different modules of the system of FIG. 1 and in particular the injection module 10.

Supercontinuum-Source Injection Module

In a first embodiment, described in connection with FIG. 2, the injection module 10 is based on the combination of a light source of the supercontinuum type 9 and a tunable spectral filter 8.

Supercontinuum sources are available on the market.

A supercontinuum source 9 generally includes a laser source 91 and a dispersive optical component 92, having an anomalous, or preferably normal, dispersion. The laser source 91 emits a pulsed radiation, the source pulses having a duration of 800 ps, at a single determined wavelength, for example 1064 nm, with a spectral width of 0.06 nm. A dispersive optical component 92, for example with an optical fibre, and more particularly based on a photonic optical fibre or a micro-structured fibre, is used. The dispersive optical component 92 spectrally widens the laser radiation to form a radiation of the supercontinuum (SC) type extending continuously over a wide spectral band. The process at the origin of the formation of a supercontinuum radiation in a photonic or micro-structured fibre are in particular the phase auto-modulation, the Raman effect and/or also the four-wave mixing. These physical processes are complex and vary according to the fibre length, the duration of the pump pulse, and the pump wavelength with respect to a wavelength at which the dispersion is null, also called zero dispersion. The choice of these parameters and of the dispersive optical component 92 determines the spectral width and the spectral shape of the supercontinuum radiation.

In practice, it is preferable to optically pump the dispersive optical component 92 at a wavelength close to a wavelength at the zero dispersion (ZDM, for "Zero Dispersion Wavelength") of this dispersive optical component 92, because the higher the dispersion, the less important the non-linear effects. In an example, a micro-structured fibre 92 having a zero dispersion wavelength lower than 1064 nm (for example of 1060 nm) that is optically pumped by a pump diode having a pump wavelength of 1064 nm. In another example, the zero dispersion wavelength of the micro-structured fibre 92 is of 1300 nm and the pump wavelength is of 1550 nm.

Preferably, a dispersive optical component 92 is used. The fibre intrinsically produces linearly chirped light pulses 100. By "chirped pulses", it is meant temporally stretched light pulses, and by "linearly chirped pulses", it is meant pulses having an instantaneous frequency that varies linearly as a function of time.

On the other hand, the operation of the supercontinuum source 9 in pulse regime is obtained by controlling a laser pump 91. The supercontinuum source 9 hence delivers short pulses 100, having a duration comprised between 0.1 ps and 100 ps, of low energy, having an energy per pulse of the order of 10 nJ to 1 microjoule, according to the duration of the pulses, and that extend over a wide spectral band. For example, the short pulses 100 have a duration comprised between 800 ps and 100 ns and a spectrum that goes from 400 to 2000 nm.

In an example, a laser 9 generates a pulsed supercontinuum radiation with short pulses 100 having a duration of about ten nanoseconds (10 ns) and a repetition rate comprised between 10 kHz and 100 MHz. The wavelength of this laser 9 varies as a function of the dispersive optical fibre 92 used (of the single-cladding, double-cladding, LMA or PCF type), whose core diameter is comprised between 2 µm and 10 µm. As a function of the zero dispersion of the dispersive optical fibre 92, short pulses 100 that are spectrally extended over a hundred of nanoliters to several hundreds of nanoliters, for example from 600 nm to 900 nm, or from 976 nm to 1100 nm, or from 1400 nm to 1600 nm, or also from 1800 to 2100 nm, can be generated.

The spectrum of the supercontinuum radiation hence generated may extend in a spectral range from the ultraviolet (wavelength of 300 nm) to the infrared (wavelength of 10 µm).

For reasons of conversion efficiency, the spectral band of the injection module 10 based on a supercontinuum source is preferably limited, so that the spectrum of emission extends over a hundred of nanoliters, for example from 980 nm to 1100 nm. Indeed, the emission of the supercontinuum source out of this spectral band is not used in the remaining of the system.

Advantageously, the supercontinuum source 9 is coupled to an exit optical fibre 19. An optical system 39, for example with a lens, spatially shapes the short pulses 100 emitted by the supercontinuum source 9 at the exit of the optical fibre 19. An optical isolator 49, arranged between two half-wave plates 39, 59, is placed between the supercontinuum source 9 and a wavelength-tunable spectral filter 8.

The spectral filter 8 is an optical filter having at least one spectral bandwidth wavelength-tunable over a wide spectral band in the infrared.

Particularly advantageously, the spectral filter 8 is wavelength-tunable over a wide spectral range in the spectral band of the supercontinuum source 9. More precisely, the central wavelength of the spectral filter 8 is wavelength-tunable over a spectral range of at least a hundred of nanoliters, and possibly of several hundreds of nanoliters. During the wavelength matching of the spectral filter, the bandwidth of the spectral filter generally remains constant.

Preferably, the bandwidth of the spectral filter 8 is limited, for example lower than 3 nm, preferably lower than 1 nm, or of 500 pm, or of 250 pm.

The examples of results illustrated in FIGS. 9 to 11, the spectral filter has a spectral width of 1.5 nm (FIG. 9), 475 pm (FIG. 10) or 250 pm (FIG. 11), respectively.

Generally, the spectral filter 8 may be passive or active. In the case of a passive filter, the spectral selection is fixed. In the case of an active filter, the peak of transmission may be offset by acting on an external control parameter such as the displacement or the rotation of a component, the temperature change or the voltage applied. A passive spectral filter hence allows filtering a single wavelength. An active spectral filter allows tuning the wavelength, continuously or by steps, over several hundreds of nanoliters comprised in the range of emission of the supercontinuum.

More precisely, the spectral filters that may be inserted in the injection module may be classified into different categories.

The first category contains the spatial filters that provide a spatial dispersion as a function of the wavelength or the optical frequency. Among these filters, the prism-based or diffraction grating-based filters provide an angular dispersion as a function of the optical frequency that allows selecting the useful wavelength.

The second category relates to the interferential filters. An interferential filter has a maximum transmission for optical frequencies that generate constructive interferences. The principle is then to use the two-wave interaction (Fabry-Perot etalon) or the multi-wave interaction (multilayer mirrors), to create effects of modulation of the transmission or of the reflectivity of the component. These interferential filters use multiple reflections on a certain number of surfaces. If all the reflected or transmitted waves are in phase, the transmission (or the reflection) is maximum. The effect of constructive interference depending by nature on the wavelength, variations of the transmission (or of the reflection) as a function of the optical frequency or of the wavelength are obtained.

The third category relates to the birefringent filters. A birefringent filter is based on phenomena of interferences by polarization between the waves propagating in a birefringent material along the ordinary axis and the extraordinary axis, respectively, of this birefringent material. The principle of the spectral filtering consists in using the extraordinary index that depends on the direction of propagation with respect to the optical axis in a birefringent medium.

Finally, another category of diffractive spectral filter is located between the spatial filters and the interferential filters. A diffractive filter uses the multiple-wave interferences generally thanks to a periodic variation of the massive material index. In this category, we find the Bragg mirrors and the acousto-optic filters. It may also be mentioned the resonating mirrors, combining a diffraction grating with a dielectric mirror. These diffractive filters offer several adjustment possibilities to discriminate the exit wavelength.

According to a particularly advantageous aspect, certain filters may be configured to generate simultaneously several distinct and tunable coherent wavelengths. Hence, a filter of the interferential or acousto-optic type may be used for that purpose. In the case of an interferential filter, the wavelengths are passively filtered by the interferential filter that lets through spectral bands that are regularly spaced apart in wavelength, in the known form of a radiation comb. In the case of an acousto-optical filter, an acoustic wave is generally applied to a crystal to generate a diffracted wavelength. The simultaneous application of several acoustic waves, of different phases, to the crystal of the acousto-optic filter, allows the superimposition of different diffracted wavelengths. According to the configuration of the interferential or acousto-optic filter considered, the spacing between these different wavelengths may extend from 0.01 nm to 100 nm and the number of wavelengths simultaneously available may be comprised between 2 and 30. This wavelength number may be variable and be modified by controlling certain parameters of the filter. The spectral width of each spectral band is generally comprised between 0.01 nm and 5 nm, and preferably of 0.1 nm. The wavelength tunability band may be made over wide spectral bands from 400 to 700 nm or from 700 to 1200 nm or from 1300 to 1700 or also from 1800 to 2200 nm.

That way, we have several distinct and tunable coherent wavelengths in a same and single laser beam. We find applications for this type of multi-wavelength system in particular in spectroscopy or bio-imagery.

By way of example, by means of an acousto-optic tunable filter, it is possible, by means of a controller, to diffract from one to sixteen wavelengths, of a spectral width of 0.6 nm and separated from each other by at least 1 nm.

That way, an acoustic-optic filter has allowed filtering simultaneously pulses with three distinct wavelengths equal to 1000 nm, 1030 nm and 1100 nm.

In short, in the first embodiment, the injection module 10 includes a supercontinuum source and a spectral filter as described hereinabove.

A surprising result of this arrangement of the injection module is that not only the spectral filter 8 filters spectrally the light pulses on a narrow spectral band (from 250 pm to 1.5 nm of spectral width), but this spectral filter 8 also temporally filters the light pulses. At the exit of the injection module 10, it is indeed observed that the light pulses 110 have a duration of the order of a picosecond, for example comprised between 0.1 ps and 100 ps, and preferably from the 20 to 50 ps, for pulses 100 emitted by the supercontinuum source of a duration of the order of a nanosecond (between 800 ps and 100 ns). More precisely, it is observed that the duration of the light pulses 110 is inversely proportional to the spectral width of the spectral filter 8. This temporal filtering effect is not yet completely explained. For example, for a spectral width of the filter of 1.5 nm, a light pulse duration of 3 ps (see FIG. 9) is measured, for a spectral width of the filter of 475 pm, a light pulse duration of 7 ps (see FIG. 10) is measured, and for a spectral width of the filter of 250 pm, a light pulse duration of 11 ps (see FIG. 11) is measured, respectively.

Due to the complex process of formation of a supercontinuum radiation by different non-linear effects, the filtering of this supercontinuum radiation causes the reduction of the pulse duration, passing from nanosecond pulses to picosecond pulses, the duration of the pulses 110 at the exit of the spectral filter inversely varying with the spectral width of the spectral filter 8.

An injection module 10 is then made from a supercontinuum source 9, based on a laser 91 emitting pulses at a single wavelength, which are then spectrally extended and linearly chirped, then filtered by means of a spectral filter 8. This injection module 10 generates ultra-short light pulses 110 of a duration of the order of a picosecond (from 1 to about 20 ps), linearly chirped and spectrally filtered over a narrow spectral band width (from 250 pm to a few nanoliters). By varying the central wavelength of the wavelength-tunable spectral filter 8, this first example of injection module 10 allows matching the wavelength of the ultra-short light pulses 110 over a wide spectral band of at least a hundred of nanoliters, up to several hundreds of nm, in a relatively simple manner and for a small cost. The ultra-short light pulses 110 generated by the injection module 10 based on a supercontinuum source 9 and a spectral filter 8 have a power of about 20 microwatts to 1 milliwatt.

Non-Linear Loop Injection Module

In a second embodiment, described in connection with FIG. 3, the injection module 10 is based on a mode-locked laser that is wavelength-tunable over a wide spectral domain in the infrared, which extends for example from 976 nm to 1030 nm.

More precisely, the injection module 10 is based on a mode-locked laser comprising a non-linear amplifying loop mirror (also called NALM).

In FIG. 3, the injection module 10 comprises a non-linear amplifying loop mirror 99. The non-linear amplifying loop mirror 99 is 8-shaped and comprises a first non-linear amplifying loop 11 and a second non-linear amplifying loop 12, connected to each other by a coupler 5.

More precisely, the first non-linear amplifying loop 11 includes a first optical amplifier 1, for example a section of ytterbium-doped optical fibre, of the single-mode type, of 10 cm to 1 m long, with a core diameter of 6 to 10 microns, an optical coupler-multiplexer 6, a wavelength-tunable spectral filter 8, an optical isolator 4 and an exit coupler 15. A pump 3 is injected at the input of the optical coupler-multiplexer 6, in the first non-linear loop 11, so as to optically pump the first optical amplifier 1.

The second non-linear amplifying loop 12 includes a second optical amplifier 2, for example a section of ytterbium-doped optical fibre, of the single-mode type, of 10 cm to 1 m long, with a core diameter of 6 to 10 microns, an optical coupler-multiplexer 16 and a passive optical fibre 7, for example a silica fibre having a core diameter of 6 to 10 microns and a length of 10 cm to 20 m.

A pump 13 is injected at the entry of the optical coupler-multiplexer 16, in the second non-linear amplifying loop 12, so as to optically pump the second optical amplifier 2.

The pumps 3, 13 are for example single-mode fibred diodes.

A spectral filter 8 has been arranged inside the cavity of the mode-locked laser. The spectral filter 8 is an optical filter having a bandwidth that is wavelength-tunable over a wide spectral domain in the infrared, as described in connection with the first embodiment.

Preferably, the bandwidth of the spectral filter is limited, for example lower than 3 nm or than 1 nm or also than 0.5 nm, or also than 250 pm.

By way of illustrative and non-limiting example, the wavelength-tunable spectral filter 8 comprises an interferential filter, an acousto-optic filter or a thin-layer acousto-optic filter. The spectral filter 8 may be wavelength-tunable by electronic and/or mechanical control means over a wide spectral width of about a hundred of nanoliters, up to several hundreds of nm.

Particularly advantageously, the first optical amplifier 1 and/or the second optical amplifier 2 are wide spectral band optical amplifiers. More precisely, instead of using an amplifying fibre of the aluminosilicate type, an erbium-doped and phosphor-codoped optical fibre is selected so that the spectral band of amplification of this optical fibre extends over at least one wide spectral band in the near infrared from 976 nm to 1030 nm. By "wide spectral band", it is herein understood a spectral band extending over at least a hundred of nanoliters and able to extend over several hundreds of nanoliters.

Preferably, the first optical amplifier 1, the second optical amplifier 2 and the optical fibre 7 have a normal dispersion, i.e. a negative dispersion, comprised for example between −100 and 0 ps/km/nm for silica.

Hence, an injection module 10 based on a mode-locked laser comprising a non-linear amplifying loop mirror 99 and a spectral filter 8 delivers ultra-short light pulses 110, of a duration lower than about 10 ps, linearly chirped, at a rate of a few MHz, spectrally filtered with a spectral width of the order of a nanometer and wavelength-tunable between 976 nm and 1030 nm, and having a power of about a few milliwatts.

In a variant, the injection module 10 is based on a mode-locked laser comprising a non-linear loop mirror (also called NOLM), comprising only the first amplifying loop 11. In this case, the dispersive component 7 is placed in the loop 11.

An injection module 10 has hence be made, based on a supercontinuum source, as illustrated in FIG. 2, or on a non-linear loop mirror, as illustrated in FIG. 3. The injection module 10 generates ultra-short light pulses 110, of a duration lower than about 10 ps, linearly chirped, spectrally filtered, the ultra-short pulses having a spectral width of the order of a nanometer, and wavelength-tunable over a spectral band of several tens of nanoliters, for example between 976 nm and 1030 nm, by means of the tunable spectral filter 8.

The injection module 10 delivers ultra-short light pulses 110 of low spectral width (having a spectral width of about 1 nm), which may then be injected into an amplification module.

Pre-Amplification Module

In FIG. 4 is shown a pre-amplification module arranged at the exit of an injection module 10 based for example on a supercontinuum source 9 and a spectral filter 8, as described in connection with FIG. 2. The pre-amplification module includes an optical isolator 14, a multiplexer coupler 26, a pump 23, an optical amplifier 21 and another optical isolator 24. The pre-amplification module receives the ultra-short light pulses 110 from the injection module 10 and generates, by optical amplification, pre-amplified ultra-short light pulses 120. Preferably, the optical amplifier 21 is an amplifier with an optical fibre, for example a rare earth-doped optical fibre.

That way, a same injection module 10 may inject ultra-short light pulses to different optical amplifiers respectively associated with different bands of emission. It is just necessary for that purpose to match the wavelength of the spectral filter 8 of the injection module as a function of the gain band of the selected optical amplifier.

For example, an amplification module is used, which has a Master-Oscillator-Power-Amplifier (MOPA) structure, for example as shown in FIG. 1. Indeed, the MOPA architecture allows extracting high powers, under certain conditions, wavelength-tunable over an extended spectral band corresponding to the different usable optical amplifiers.

Power Amplification Module

In FIG. 5 is shown a power amplification module that may be arranged at the exit of an injection module 10 or at the exit of a pre-amplification module. The power amplification module includes an optical isolator 34, a multiplexer coupler 36, a pump 33, an optical amplifier 31 and another optical isolator 44. The power amplification module receives for example the pre-amplified ultra-short light pulses 120 from the pre-amplification module and generates, by optical amplification, amplified ultra-short light pulses 130.

Preferably, the optical amplifier 31 is a fibre optic amplifier, for example a rare earth-doped optical fibre.

In a particular exemplary embodiment, an ytterbium-doped fibre amplifier allowing the amplification at a wavelength of about 1 µm is used. That way, a wavelength matching range of the order of 100 nm (from 1020 nm to 1120 nm), with pulses of variable duration comprised between 3 ps and 20 ps, is obtained. In practice, the duration of the pulses is limited by the filter used.

Another solid amplifying medium is in particular based on a neodymium-YAG (Nd-Yag) crystal for the spectral domain about 1064 nm (doubled in frequency to obtain a wavelength of 532 nm).

In other spectral domains, other amplifying mediums may also be used. By way of example, it may be used an amplifying medium based on forsterite (wavelength of emission at 1200 nm, then doubled in frequency at 600 nm), or erbium:YAG (Er:YAG) emitting around 3 µm, or also alexandrite emitting at 755 nm and doubled in frequency at 380 nm, or also ruby emitting at 694 and doubled in frequency at 350 nm.

Another operating mode may also be based on different amplifiers with optical fibres respectively doped with different rare earths to cover different spectral ranges: in particular, a praseodymium-doped fibre emitting in the range 488-900 nm and 1300 nm, a neodymium-ytterbium-codoped fibre emitting in the range 890-940 nm and/or 976-1200 nm, a holmium-doped fibre emitting in the range 2100-2200 nm, an Erbium-doped fibre emitting in the range 1460-1600 nm and/or also a thulium-doped fibre emitting in the range 1600-2200 nm.

The injection module 10 may deliver pulses 110 at a very high rate of 20 kHz to 50 MHz. At the exit of the amplification modules of high mean power, from 100 mW to 10 W, are produced trains of intense and ultra-short pulses inside an envelope controlled by the duration and the rate of the pump flash of the amplifier.

Amplification Modules Arranged as a Star about a Same Injection Module

In FIG. 8 is shown a system for generating wavelength-tunable ultra-short light pulses according to another exemplary embodiment of the invention.

The system includes several different optical amplifiers 31, 32, 33, 34 (based on glass or crystal solid mediums) arranged as a star about a flash lamp in multi-passage arrangements in the most probable way. This set of optical amplifiers 31, 32, 33, 34 is injected by a single injection module 10 that is wavelength-tunable and selectively directed towards either one of the optical amplifiers 31, 32, 33, 34. A filtering-directing operation may be performed by means of prisms 60-66 or of adapted diffractive elements and/or of semi-reflective plates 50, 51, 52. Other semi-reflective plates 54, 55 and mirrors 53, 56 allow recombining the different amplified beams towards a same exit. A non-linear optical medium 41 may be inserted at the exit of the device to perform the frequency conversion required for the delivery of the adapted wavelength as a function of the desired application.

Frequency Converter Module by Four-Wave Mixing

FIG. 6 schematically shows another exemplary embodiment of a system for generating wavelength-tunable ultra-short light pulses. In this embodiment, the system for generating wavelength-tunable ultra-short light pulses includes an injection module 10, a pre-amplification module 20 and/or a power amplification module 30 and a frequency converter module 40.

The injection module 10, the pre-amplification module 20, the power amplification module 30 and the frequency converter module 40 are arranged in series. An optical isolator 44 is arranged between the power amplification module 30 and the frequency converter module 40.

At the exit of the optical amplifier(s) 20, 30, it is obtained ultra-short amplified pulses 130, of a duration comprised between 1 ps and about 20 ps, wavelength-tunable over a hundred of nanoliters up to about 300 nm and intense from 1 kW to 1 MW in peak-power.

The original temporal structure of this laser source is very favourable for the frequency conversion, hence allowing to extend very significantly the spectral domain accessible by the complete system.

The frequency converter module 40 is based on a non-linear optical component arranged downstream from the optical amplification module 30. By a non-linear effect of degenerated four-wave mixing (DFWM), from two amplified pulses coming from the same source, the non-linear optical component 40 produces a signal 140 at the double frequency of that of the amplified pulses 130. The non-linear optical component 40 also produces a complementary wave 141 (also called "idler"). As a function of the wavelength of the amplified pulses 130, i.e. as a function of the wavelength of the spectral filter 8, the signal 140 is emitted at a wavelength comprised in the visible and able to go from the yellow to the red over a spectral range of 550 to 700 nm, still inaccessible up to now.

The amplified pulses 130 have a sufficient intensity so that the frequency conversion by four-wave mixing has a strong efficiency.

More precisely, the four-wave mixing (FWM) is a non-linear process associated with the supercontinuum generation. The degenerated four-wave mixing (DFWM) appears when two identical pump photons are annihilated to produce two photons with different wavelengths and the same total energy. Searches have been intensively carried out about the process of phase matching by the dispersion of the optical fibres at the telecommunication wavelengths about 1.5 μm.

These are the photonic crystal fibres (PCF) that have allowed providing the necessary dispersion for a pumping with shorter wavelengths, about 1 μm and hence producing wavelengths about 660 nm. The efficiencies of conversion are of 10 to 30% for a passage in a fibre of the PCF type having a length of the order of a meter. Due to the fact that the FWM converts the pump into a pair of discrete wavelengths instead of a wide continuum, it allows delivering a power spectral density far higher at specific wavelengths.

Whereas a high-power supercontinuum source can generate a few mW/nm over the visible spectrum, the FWM is capable of delivering a power higher than ten watts at a specific wavelength. Hence, it can be obtained spectral densities of very high power, of the order of one W/nm, thanks to this process. By associating a tunable source 10, a pre-amplifier module and/or an amplifier module and a frequency converter module 40, it then becomes possible to generate new wavelengths over a wide band in the spectral domain of the visible.

FIG. 7 illustrates an exemplary embodiment of a system for generating ultrashort and spatially-filtered pulses combined to a frequency converter module. The system of FIG. 7 is essentially based on optical fibre components. More precisely, the system of FIG. 7 includes a supercontinuum source 9 and a wavelength-tunable spectral filter 8, as descried in connection with FIG. 2. The system includes in series a first optical pre-amplifier 21, a second optical pre-amplifier 22, a power optical amplifier 30, and a non-linear optical component 40. The optical component 40 is for example a photonic crystal fibre (PCF). Optical isolators 14, 24, 34, 44 are arranged between the different modules of the system. The non-linear optical component 40 receives the ultra-short, spectrally filtered and amplified light pulses, and generates a signal wave 140 and a complementary wave 141 (also called "idler"), the sum of the optical frequencies of the signal wave 140 and of the complementary wave 141 being equal to the optical frequency of the pump wave.

From an injection module 10 tunable in the near-infrared domain (between 976 and 1030 nm), it is obtained a signal comprising light pulses 140 in the domain of the visible from 510 to 620 nm and/or a complementary one comprising light pulses 141 in the infrared domain from 1.8 to 5 microns.

The system for generating pulses illustrated in FIG. 7 has the advantage to be robust and compact. The applications of this system are very varied. The range of emission wavelengths accessible with such a tunable source combined with a high mean power, from 100 mW to 10 W, is particularly innovative and allows contemplating new thermally-assisted laser methods, whether it is in imagery or in machining.

The system for generating pulses according to any one of the embodiments detailed hereinabove is particularly interesting for medical applications. Indeed, this system allows delivering an energetic radiation with pulses that are both ultra-short (of the order of a picosecond), with a low spectral width (of the order of 1 nm) and a central wavelength tunable over a very wide spectral domain (from the near UV ~300 nm to several microns). The architecture of the tunable injection module allows contemplating many medical applications, particularly in dermatology, where the adjustment of the wavelength is necessary for the optimization of the treatment. This wavelength tunability over a wide spectral range allows adapting the parameters of the ultra-short light pulses delivered as a function of the operating conditions, for example to treat a stain or a cutaneous defect. Different optical amplifiers adapted to amplify pulses in different wavelength ranges may be assembled around common pumping means (flash lamp, diodes or other). This system of amplification is injected by a single injection module having a wideband spectrum. The tunability of the unit is based on the extremely extended spectrum of this injector and the mean power on the use of high-gain amplifying mediums.

Moreover, the ultra-short duration of the pulses allows combining the system for generating pulses with a non-linear optical component of frequency conversion. This frequency conversion hence allows very significantly extending the spectrum generated by the complete system.

Pulse Measurements

FIGS. 9 to 11 represent measurements of spectral profile of wavelength-tunable ultra-short light pulses, obtained by means of an optical spectrum analyser and, respectively, measurement of temporal profile of these pulses, obtained by an auto-correlator, for different spectral widths of the tunable filter 8.

In FIG. 9, amplified pulses are measured at the exit of a system of generating pulses as detailed in connection with FIG. 1.

Both the duration and the spectral width of these pulses are measured.

The spectral width of the pulses is determined by the spectral width of the tunable filter 8.

In FIGS. 9 to 11 are shown measurements of intensity of a light pulse as a function of time (small rounds) and a curve of Gaussian adjustment of the temporal shape of this pulse (full line). In insert is shown a measurement of the intensity of this pulse as a function of the wavelength.

In FIG. 9, it is deduced from the curve of Gaussian adjustment of the temporal shape of the pulse that the duration of this pulse is equal to 3 ps. In FIG. 9, in insert, the central wavelength of this pulse, which is of about 1030 nm, as well as the spectral width of this pulse, which is of 1.5 nm, are determined.

By varying only the spectral width of the tunable filter and by maintaining fixed the central wavelength of this filter, measurements are made similarly to those of FIG. 9.

In FIG. 10, light pulses having a duration equal to 7 ps, a spectral width of 475 pm and a central wavelength of about 1030 nm, are measured.

Likewise, in FIG. 11, light pulses having a duration equal to 11 ps, a spectral width of 250 pm and a central wavelength of about 1030 nm, are measured.

The system hence allows generating pulses having both an ultra-short duration (about 1 picosecond to 11 ps) and a very narrow spectral width of 1.5 nm, 475 pm and 250 pm, respectively, at a central wavelength of about 1030 nm.

The system allows generating ultra-short laser pulses of a duration of a picosecond, of a very low spectral width. These pulses are wavelength-tunable over a range of several tens to several hundreds of nanoliters. These pulses may be amplified, so that picosecond pulses having very high power spectral density and being wavelength-tunable overs a wide spectral domain from the ultraviolet (300 nm) to the infrared (up to 10 microns) are obtained.

The invention claimed is:

1. A system for generating ultra-short light pulses that are wavelength-tunable in a spectral domain comprised between the ultraviolet and the infrared, said system comprising: —an injection module comprising a light source and a wavelength-tunable spectral filter, —the light source being configured to generate short light pulses, of a duration comprised between several hundreds of picoseconds and a hundred of nanoseconds, said short light pulses extending over a spectral band of emission having a spectral width of several tens of nanometres to several hundreds of nanometres, —the spectral filter having at least one spectral bandwidth defined by a central wavelength (Lambda3) and a spectral width (ALambda3) comprised between 10 pm and 10 nm, and the central wavelength (Lambda3) of said spectral bandwidth being tunable in a spectral range ([Lambda1; Lambda2]) comprised in the spectral band of emission of the light source, the spectral filter being configured to spectrally filter and to temporally shape said short light pulses, so that the injection module generates ultra-short light pulses, of a duration of the order of a picosecond, spectrally filtered and wavelength-tunable as a function of the central wavelength of said spectral bandwidth, wherein the injection module comprises a non-linear amplifying loop mirror; and—different optical amplifiers configured to amplify pulses in different wavelength ranges, said different optical amplifiers being arranged around a common pump at the exit of the injection module, said different optical amplifiers being configured to receive said spectrally filtered and wavelength- tunable ultra-short light pulses and to generate by optical amplification ultra-short amplified pulses, spectrally filtered and wavelength-tunable as a function of the central wavelength of said spectral bandwidth of the spectral filter and of the different optical amplifiers, and the non-linear amplifying loop mirror comprising another optical amplifier arranged on the optical path of the non-linear loop mirror and the spectral filter being arranged on the optical path of the non-linear loop mirror.

2. The system for generating ultra-short light pulses according to claim 1, wherein the non-linear amplifying loop mirror is 8-shaped and comprises a first, bidirectional non-linear amplifying loop and a second, unidirectional non-linear loop, the spectral filter being arranged in the first non-linear loop.

3. The system for generating ultra-short light pulses according to claim 1, wherein the spectral filter comprises a prism-based filter, a diffraction grating-based filter, an interferential filter, a birefringent filter, un Bragg mirror diffractive filter, a resonating mirror diffractive filter, an acousto-optic filter or a thin-layer acousto-optic filter.

4. The system for generating ultra-short light pulses according to claim 3, wherein the spectral filter is an interferential filter or an acousto-optic filter configured to filter simultaneously a plurality of spectral bandwidths spectrally spaced apart from each other, each spectral bandwidth being defined by a central wavelength (Lambda3) and a spectral width (ΔLambda3) comprised between 10 pm and 10 nm, and each central wavelength (Lambda3) of the spectral filter being tunable in a spectral range ([Lambda1; Lambda2]) comprised in the spectral band of emission of the light source.

5. The system for generating ultra-short light pulses according to claim 3, wherein the spectral filter has a spectral width (ΔLambda3) lower than 1 nm.

6. The system for generating ultra-short light pulses according to claim 1, wherein said different optical amplifiers comprise a plurality of optical amplifiers arranged as a star and/or an optical fibre pre-amplifier and a power optical fibre amplifier arranged in series.

7. The system for generating ultra-short light pulses according to claim 1, wherein the light source, the spectral filter and/or the another optical amplifier comprise optical fibre components.

8. The system for generating ultra-short light pulses according to claim 1, wherein said another optical amplifier comprises a rare earth-doped optical fibre.

9. The system for generating ultra-short light pulses according to claim 1, further comprising: —of negative dispersion arranged at the exit of the at least one of said different optical amplifiers, the dispersive optical component being configured to receive simultaneously a pump pulse and an ultra-short amplified pulse and to generate, by non-linear optical effect of four-wave mixing, a first optical signal and a second optical signal, the first or the second optical signal comprising an exit light pulse of a duration of the order of a picosecond to a hundred of picoseconds, and at a predetermined wavelength in the ultraviolet, visible or infrared domain, and having a spectral width lower than 10 nm, the predetermined wavelength of the exit light pulse being tunable as a function of the central wavelength (Lambda3) of the spectral filter.

10. The system for generating ultra-short light pulses according to claim 9, wherein the dispersive optical component comprises a section of photonic optical fibre.

11. A method for generating wavelength-tunable ultra-short light pulses comprising the following steps: —using an injection module comprising a light source and a non-linear amplifying loop mirror, another optical amplifier being arranged on the optical path of the non-linear loop mirror for generating short light pulses, of a duration comprised between several hundreds of picoseconds and a hundred of nanoseconds, said short light pulses extending over a spectral band of emission having a spectral width of several tens of nanometres to several hundreds of nanometres; - using a wavelength-tunable spectral filter arranged on the optical path of the non-linear loop mirror for spectrally filtering said short pulses in at least a spectral bandwidth defined by a central wavelength (Lambda3) and a spectral width (Alambda3) comprised between 10 pm and 10 nm, the central wavelength (Lambda3) of said spectral bandwidth of the spectral filtering being tunable in a spectral range ([Lambda1; Lambda2]) comprised in said spectral band of emission, the spectral filtering being configured to spectrally filter and to temporally shape said short light pulses, so as to generate ultra-short light pulses of a duration of the order of a picosecond, spectrally filtered and wavelength-tunable as a function the central wavelength of said spectral bandwidth, and —using different optical amplifiers configured to amplify pulses in different wavelength ranges, said different optical amplifiers being arranged around a common pump at the exit of the injection module for optically amplifying said spectrally filtered ultra-short pulses to generate ultra-short amplified pulses that are spectrally filtered and wavelength-tunable as a function of the central wavelength of said spectral bandwidth of the spectral filter and of said different optical amplifiers.

12. A method for generating wavelength-tunable ultra-short light pulses according to claim 11, further comprising the following steps:

using a non-linear optical component for generating, from a pump pulse and an ultra-short amplified pulse, by non-linear optical effect of four-wave mixing in a dispersive optical component of negative dispersion, a first optical signal and a second optical signal, the first or the second optical signal comprising an exit ultra-short light pulse, of a duration of the order of a picosecond to a hundred of picoseconds and at a predetermined wavelength in the ultraviolet, visible or infrared domain, with a spectral width lower than 10 nm, the predetermined wavelength of the exit ultra-short light pulse being tunable as a function of the central wavelength (Lambda3) of said spectral bandwidth of the spectral filter.

13. The system for generating ultra-short light pulses according to claim 2, wherein the spectral filter comprises a prism-based filter, a diffraction grating-based filter, an interferential filter, a birefringent filter, un Bragg mirror diffractive filter, a resonating mirror diffractive filter, an acousto-optic filter or a thin-layer acousto-optic filter.

14. The system for generating ultra-short light pulses according to claim 4, wherein the spectral filter has a spectral width (ΔLambda3) lower than 1 nm.

15. The system for generating ultra-short light pulses according to claim 3, wherein the light source, the spectral filter and/or the another optical amplifier comprise optical fibre components.

16. The system for generating ultra-short light pulses according to claim 7, wherein another optical amplifier comprises a rare earth-doped optical fibre.

17. The system for generating ultra-short light pulses according to claim 2, further comprising: —a dispersive optical component of negative dispersion arranged at the exit of the said at least one of the different optical amplifiers, the dispersive optical component being configured to receive simultaneously a pump pulse and an ultra-short amplified pulse and to generate, by non-linear optical effect of four-wave mixing, a first optical signal and a second optical signal, the first or the second optical signal comprising an exit light pulse of a duration of the order of a picosecond to a hundred of picoseconds, and at a predetermined wavelength in the ultraviolet, visible or infrared domain, and having a spectral width lower than 10 nm, the predetermined wavelength of the exit light pulse being tunable as a function of the central wavelength (Lambda3) of the spectral filter.

18. The system for generating ultra-short light pulses according to claim 7, further comprising: —a dispersive optical component of negative dispersion arranged at the exit of the different optical amplifiers, the dispersive optical component being configured to receive simultaneously a pump pulse and an ultra-short amplified pulse and to generate, by non-linear optical effect of four-wave mixing, a first optical signal and a second optical signal, the first or the second optical signal comprising an exit light pulse of a duration of the order of a picosecond to a hundred of picoseconds, and at a predetermined wavelength in the ultraviolet, visible or infrared domain, and having a spectral width lower than 10 nm, the predetermined wavelength of the exit light pulse being tunable as a function of the central wavelength (Lambda3) of the spectral filter.

* * * * *